United States Patent
Ito et al.

(10) Patent No.: US 6,195,671 B1
(45) Date of Patent: Feb. 27, 2001

(54) ELECTRONIC COMPUTING APPARATUS HAVING ARITHMETIC PROCESSING FUNCTION AND ARITHMETIC PROCESSING METHOD

(75) Inventors: Matsutaka Ito, Yamatokoriyama; Fumiaki Kawawaki, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/058,284

(22) Filed: Apr. 10, 1998

(30) Foreign Application Priority Data

Apr. 16, 1997 (JP) .................................................. 9-099332

(51) Int. Cl.[7] ...................................................... G06F 1/16
(52) U.S. Cl. ............................................ 708/131; 708/146
(58) Field of Search ..................................... 708/130, 131, 708/141, 142, 143, 144, 145, 146, 160, 167, 168

(56) References Cited

U.S. PATENT DOCUMENTS

| | | | |
|---|---|---|---|
| 4,481,598 | * 11/1984 | Ishiwata | 708/174 |
| 5,008,847 | * 4/1991 | Lapeyre | 708/146 |
| 5,594,673 | * 1/1997 | Coffin | 708/145 |

FOREIGN PATENT DOCUMENTS 61-269764    11/1986   (JP) .

* cited by examiner

*Primary Examiner*—Chuong Dinh Ngo
(74) *Attorney, Agent, or Firm*—Nixon & Vanderhye P.C.

(57) ABSTRACT

It is an object of the invention to provide an electronic computing apparatus having an arithmetic processing function and an arithmetic processing method which allow an arithmetic expression to be readily inputted. A screen showing stored contents of an arithmetic expression menu table is displayed by specifying an arithmetic expression menu display command key. Then, selecting an arithmetic expression from the displayed plurality of arithmetic expressions by an input pen allows the selected arithmetic expression to be inputted. A controller executes arithmetic processing in accordance with the selected arithmetic expression and displays the result of the arithmetic processing as a graph on the display. Accordingly, the arithmetic expression may be readily inputted just by selecting the arithmetic expression from the predetermined plurality of arithmetic expressions. Further, the desired arithmetic expression may be inputted while watching all the arithmetic expressions because the arithmetic expression menu table is displayed.

14 Claims, 5 Drawing Sheets

FIG. 2

| | 23 | | 24 | | 25 | |
|---|---|---|---|---|---|---|
| | 17 | 18 | 19 | 20 | 21 | 22 |
| 1 | $X^2$ | A) | $Y=AX^2$ | | 1) | $Y=AX^2$ |
| | | | | | 2) | $Y=X^2$ |
| | | | | | 3) | $Y=3X^2$ |
| | | | | | 4) | $Y=1/2\ X^2$ |
| | | | | | 5) | $Y=-2X^2$ |
| | | B) | $Y=AX^2+B$ | | 1) | $Y=AX^2+B$ |
| | | | | | 2) | $Y=X^2+1$ |
| | | | | | 3) | $Y=2X^2-1$ |
| | | | | | 4) | $Y=-X^2+1$ |
| | | | | | 5) | $Y=-2X^2-1$ |
| | | C) | $Y=A(X-H)^2+K$ | | 1) | $Y=A(X-H)^2+K$ |
| | | | | | 2) | $Y=2(X-1)^2+2$ |
| | | | | | 3) | $Y=-2(X-1)^2+2$ |
| | | | | | 4) | $Y=(X+2)^2-1$ |
| | | | | | 5) | $Y=-(X+2)^2-1$ |
| | | D) | $Y=AX^2-BX-C$ | | 1) | $Y=AX^2+BX+C$ |
| 2 | $B^A$ | A) | $Y=B^A$ | | 1) | $Y=B^A$ |
| 3 | LOG | A) | $Y=\log_B X$ | | 1) | $Y=\log_B X$ |
| | | B) | $Y=A\log_B(X-H)+K$ | | 1) | $Y=A\log_B(X-H)+K$ |
| | | C) | $Y=A\ln(X-H)+K$ | | 1) | $Y=A\ln(X-H)+K$ |

| | 23 | | 24 | | 25 | |
|---|---|---|---|---|---|---|
| | 17 | 18 | 19 | 20 | 21 | 22 |
| 4 | TRIG | A) | Y=Asin (BX-H)+K | | 1) Y=Asin (BX-H)+K<br>2) Y=2sin (-2X+π)+2<br>3) Y=1/2sin (X-π/2)-1<br>4) Y=-2sin (-2X+π)+2<br>5) Y=-1/2sin (X-π/2)-1<br>6) Y=sin (2X+π/2)+1<br>7) Y=sin (2X-π/2)+1 | |
| | | B) | Y=Acos (BX-H)+K | | 1) Y=Acos (BX-H)+K<br>2) Y=2cos (-2X+π)+2<br>3) Y=1/2cos (X-π/2)-1<br>4) Y=-2cos (-2X+π)+2<br>5) Y=-1/2cos (X-π/2)-1<br>6) Y=1/2cos (2X+π/2)+1<br>7) Y=1/2cos (2X-π/2)+1 | |
| | | C) | Y=Atan (BX-H)+K | | 1) Y=Atan (BX-H)+K | |
| | | D) | Y=Asec (BX-H)+K | | 2) Y=Asec (BX-H)+K | |
| | | E) | Y=Acsc (BX-H)+K | | 3) Y=Acsc (BX-H)+K | |
| | | F) | Y=Acot (BX-H)+K | | 4) Y=Acot (BX-H)+K | |
| 5 | $X^3$ | A) | $Y=AX^3+BX^2+CX+D$ | | 1) $Y=AX^3+BX^2+CX+D$ | |
| | | B) | $Y=A(X-H)^3+K$ | | 1) $Y=A(X-H)^3+K$ | |
| 6 | $\frac{1}{X}$ | A) | Y=A/X | | 1) Y=A/X<br>2) Y=1/X<br>3) Y=-1/X | |
| | | B) | Y=A/(X-H)+K | | 1) Y=A/(X-H)+K | |
| | | C) | Y=(AX+B)/(CX+D) | | 1) Y=(AX+B)/(CX+D) | |
| | | D) | $Y=A/(X-H)^2+K$ | | 1) $Y=A/(X-H)^2+K$ | |
| 7 | $\sqrt{X}$ | A) | $Y=A\sqrt{BX}$ | | 1) $Y=A\sqrt{BX}$ | |
| | | B) | $Y=A\sqrt{(BX-H)}$ | | 1) $Y=A\sqrt{(BX-H)}$ | |
| | | C) | $Y=A\sqrt{(BX-H)}+K$ | | 1) $Y=A\sqrt{(BX-H)}+K$ | |
| | | D) | $Y=\sqrt[A]{BX}$ | | 1) $Y=\sqrt[A]{BX}$ | |
| 8 | \|X\| | A) | Y=A\|X-H\|+K | | 1) Y=A\|X-H\|+K | |

16

ELECTRONIC COMPUTING APPARATUS HAVING ARITHMETIC PROCESSING FUNCTION AND ARITHMETIC PROCESSING METHOD

BACKGROUND OF THE INVENTION

1. Field of the Invention

The present invention relates to an electronic computing apparatus such as an electronic portable calculators and an electronic pocketbook, capable of carrying out an arithmetic operation in accordance with a functional expression or equation, and to an arithmetic processing method.

2. Description of Related Art

Hitherto, there have been known electronic computing apparatuses capable of processing an arithmetic operation in accordance with a functional expression or an equation. Such computing apparatus comprises an input section and executes the arithmetic processing in accordance with a functional expression or equation when such expressions are inputted and it is specified to execute the arithmetic processing. The result of the arithmetic processing is displayed as a graph or the like on a display for example provided in the computing apparatus.

The above-mentioned functional expression or equation is inputted by using a plurality of numeric keys, symbol keys and arithmetic symbol keys provided at the input section. For instance, they are inputted by using trigonometric function keys of sin, cos and tan, inverse trigonometric function keys of $\sin^{-1}$, $\cos^{-1}$, $\tan^{-1}$, a $x^2$ (square) key, a $x^{-1}$ (inverse number) key, logarithmic function keys of log and ln, exponential function keys of $10^x$ and $e^x$, a $\pi$ (ratio of the circumference of a circle to its diameter) key, an a/b (fraction) key, an $a^b$ (power) key, a $\sqrt{}$(square root) key, a $\sqrt[a]{}$ (radical root) key, an abs (absolute value) key, a n! (factorial) key, a nCr (combination) key, a nPr (permutation) key, hyperbolic function keys of sin h, cos h and tan h, inverse hyperbolic function keys of $\sin h^{-1}$, $\cos h^{-1}$, $\tan h^{-1}$, an $\int$ (integral function) key, numeric keys of 0 through 9, keys of four fundamental rules of +, −, ×, ÷ and (,) and alphabet keys. A technology for inputting an arithmetic expression by using such plurality of keys has been disclosed in Japanese Unexamined Patent Publication JP-A 61-269764 for example.

However, it has been troublesome and annoying for users to complete and to input such a functional expression or an equation by selecting desired keys among such many keys as described above to cause the electronic computing apparatus to execute the arithmetic processing in accordance with the functional expression or the equation.

SUMMARY OF THE INVENTION

Accordingly, it is an object of the present invention to provide an electronic computing apparatus having an arithmetic processing function, in which an arithmetic expression can be easily inputted, and an arithmetic processing method.

The present invention provides an electronic computing apparatus having an arithmetic processing function, the apparatus comprising:

arithmetic expression selecting means for selecting one arithmetic expression from among a predetermined plurality of arithmetic expressions; and arithmetic processing means for executing arithmetic processing in accordance with the arithmetic expression selected by the arithmetic expression selecting means.

According to the invention, the arithmetic expression may be selected from the predetermined plurality of arithmetic expressions by the arithmetic expression selecting means and the arithmetic processing may be executed in accordance with the arithmetic expression thus selected. Accordingly, the arithmetic expression may be readily inputted just by selecting the arithmetic expression from the plurality of arithmetic expressions.

The invention is characterized in that the arithmetic expression selecting means includes an arithmetic expression table for storing the predetermined plurality of arithmetic expressions, and arithmetic expression specifying means for specifying an arithmetic expression, and selects the arithmetic expression specified by the arithmetic expression specifying means from among the predetermined plurality of arithmetic expressions stored in the arithmetic expression table.

According to the invention, the arithmetic expression may be readily inputted by selecting the arithmetic expression from the arithmetic expression table for storing the predetermined plurality of arithmetic expressions.

The invention is characterized in that the electronic computing apparatus further comprises arithmetic expression table displaying means for displaying the arithmetic expression table.

According to the invention, since the arithmetic expression table is displayed, a desired arithmetic expression may be inputted while seeing all the arithmetic expressions.

The invention provides an arithmetic processing method of an electronic computing apparatus, comprising the steps of:

selecting one arithmetic expression from among a predetermined plurality of arithmetic expressions; and executing arithmetic processing in accordance with the selected arithmetic expression.

According to the invention, the arithmetic processing is executed in accordance with the selected arithmetic expression by selecting the arithmetic expression from the predetermined plurality of arithmetic expressions, so that the arithmetic expression may be readily inputted.

The invention is characterized in that all selectable arithmetic expressions are displayed in selecting an arithmetic expression.

According to the invention, it is possible to input a desired arithmetic expression while watching all the arithmetic expressions which can be selected.

BRIEF DESCRIPTION OF THE DRAWINGS

Other and further objects, features, and advantages of the invention will be more explicit from the following detailed description taken with reference to the drawings wherein:

FIG. 2 shows an arithmetic expression menu table 16;

FIG. 3 shows the arithmetic expression menu table 16;

DETAILED DESCRIPTION OF THE PREFERRED EMBODIMENTS

Figure 1:
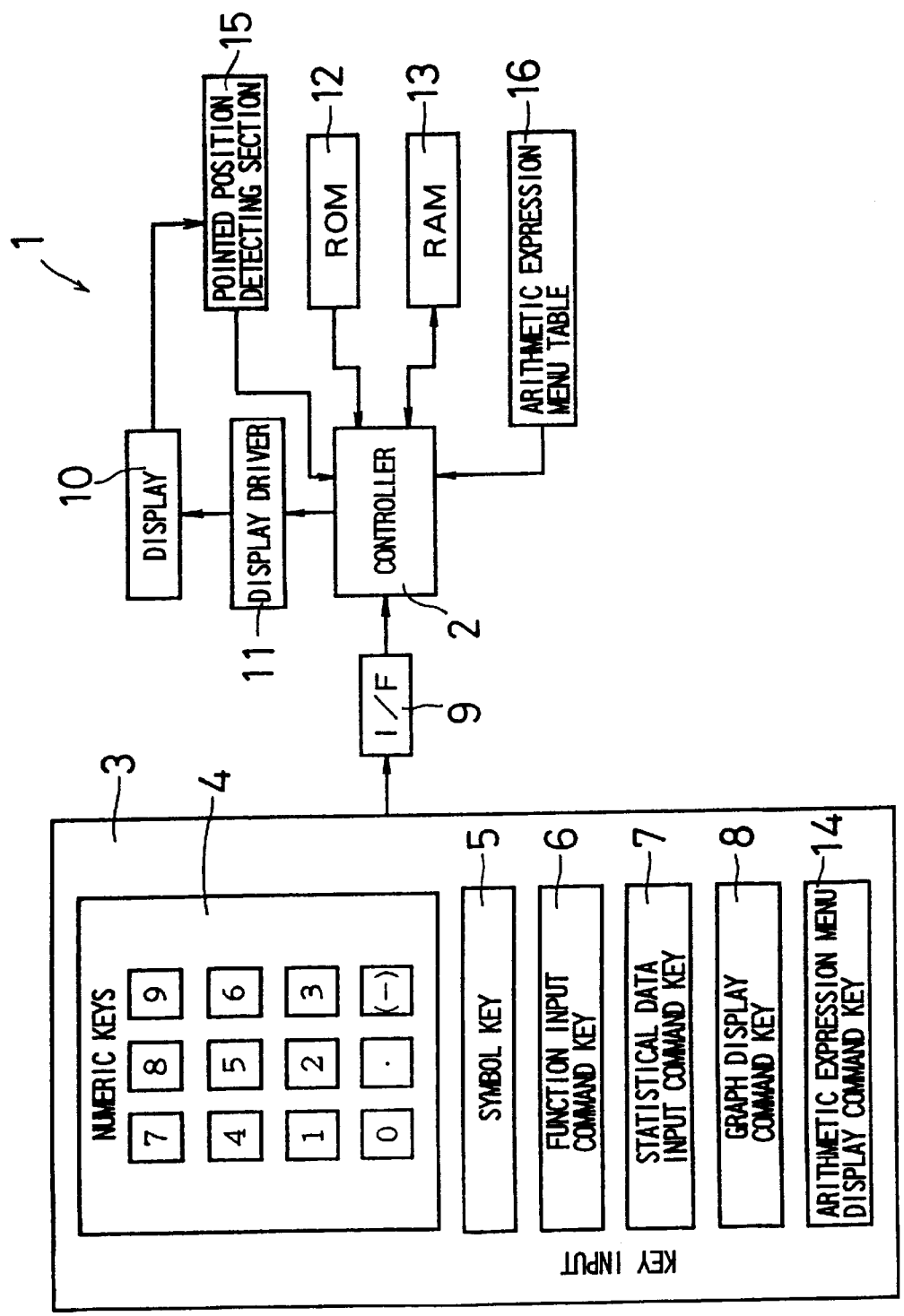
FIG. 1 is a block diagram showing an electrical structure of an electronic computing apparatus 1 according to one embodiment of the present invention.

Now referring to the drawings, preferred embodiments of the invention are described below.

FIG. 1 is a block diagram showing an electrical structure of an electronic computing apparatus 1 according to one embodiment of the present invention. The electronic computing apparatus 1 comprises a controller 2, a key input section 3, an I/F (interface) section 9, a display 10, a display driver 11, a ROM (Read Only Memory) 12, a RAM (Random Access Memory) 13, a pointed position detecting section 15 and an arithmetic expression menu table 16. The key input section 3 comprises a plurality of numeric keys 4 including those of 0 through 9, a decimal point (.) and minus (−), a symbol key 5, an arithmetic symbol key 6, a function input command key 7, a graph display command key 8 and an arithmetic expression menu display command key 14.

The numeric keys 4, the symbol key 5 and the arithmetic symbol keys 6 in the key input section 3 are arranged in the same manner with the prior art and include trigonometric function keys of sin, cos and tan, inverse trigonometric function keys of $\sin^{-1}$, $\cos^{-1}$, $\tan^{-1}$, a $x^2$ (square) key, a $x^{-1}$ (inverse number) key, logarithmic function keys of log and ln, exponential function keys of $10^x$ and $e^x$, a π (ratio of the circumference of a circle to its diameter) key, an a/b (fraction) key, an $a^b$ (power) key, a $\sqrt{}$(square root) key, a $\sqrt[a]{}$(radical root) key, an abs (absolute value) key, a n! (factorial) key, a nCr (combination) key, a nPr (permutation) key, hyperbolic function keys of sin h, cos h and tan h, inverse hyperbolic function keys of $\sin h^{-1}$, $\cos h^{-1}$, $\tan h^{-1}$, ∫ (integral function) key, numeric keys of 0 through 9, keys of four fundamental rules of +, −, ×, ÷ and (,) and alphabet keys.

The controller 2 is electrically connected with the key input section 3 via the I/F section 9, with the display 10 via the display driver 11, with the ROM 12, the RAM 13, the pointed position detecting section 15 and the arithmetic expression menu table 16, respectively, and generally controls the operations of the whole electronic computing apparatus 1 in accordance with an operating program stored in the ROM 12. The controller 2 is realized by a microprocessor for example.

The display 10 of the present embodiment is realized by a liquid crystal display having a display face of 132×64 dots for example. An input face of an input apparatus such as a tablet is placed further on the display screen of the display 10. The input face is translucent and an image displayed on the display screen is visible. An orthogonal coordinate system is also set on the input face. Still more, the electronic computing apparatus 1 is equipped with a pointing apparatus such as an input pen. The pointed position detecting section 15 detects a coordinate point on the input face pointed by the input pen and gives a coordinate point signal to the controller 2. Based on the coordinate point signal, the controller 2 executes a preset operation on the specified position.

When the function input command key 7 of the key input section 3 is specified, a function input command signal is given to the controller 2 via the I/F section 9. In response to the function input command signal, the controller 2 becomes ready to receive functional inputs and then recognizes data input from the numeric keys 4, the symbol key 5 and the arithmetic symbol key 6 as data representing a functional expression or data representing variables of the functional expression. The data representing the functional expression and the data representing the variables of the functional expression thus input are stored in the RAM 13. The RAM 13 is used also for processing data in executing various operations.

The electronic computing apparatus 1 of the present embodiment is provided with the arithmetic expression menu display command key 14 in the key input section 3 in connection with arithmetic expression selecting means for selecting an arithmetic expression among a predetermined plurality of arithmetic expressions and the arithmetic expression menu table 16 which is realized by a ROM or a RAM for example.

When the arithmetic expression menu display command key 14 is specified, an arithmetic expression menu display command signal is given to the controller 2 via the I/F section 9. In response to the arithmetic expression menu display command signal, the controller 2 becomes ready to display an arithmetic expression menu and then displays a plurality of arithmetic expressions stored in advance in the arithmetic expression menu table 16 on the display 10 driven by the display driver 11. When an area where a desired arithmetic expression is displayed is specified by an input pen connected with arithmetic expression specifying means for specifying an arithmetic expression, the arithmetic expression displayed at the specified position is selected. Data representing the arithmetic expression thus selected is also stored in the RAM 13.

When the graph display command key 8 is specified, a graph display command signal is given to the controller 2 via the I/F section 9. In response to the graph display command signal, the controller 2 becomes ready to display a graph and then causes a graph which conforms to an arithmetic expression such as a functional expression stored in the RAM 13 to be displayed on the display 10 driven by the display driver 11.

FIGS. 2 and 3 show the arithmetic expression menu table 16. In the arithmetic expression menu table 16, a predetermined plurality of arithmetic expressions are stored while being classified into groups of a plurality of stages. In the present embodiment, they are classified into groups of first through third stages 23 through 25. The arithmetic expressions may include not only functional expressions but also equations. First arithmetic expression specifying information 18 for specifying an arithmetic expression in the groups of the first stage 23 corresponds to identifier information 17 for identifying such information. The stored contents of the first stage 23 is classified further into the groups of the second stage 24. Second arithmetic expression specifying information 20 for specifying an arithmetic expression in the groups of the second stage 24 corresponds to identifier information 19 for identifying such information. The stored contents in the second stage 24 is classified further into the groups of the third stage 25 and third arithmetic expression specifying information 22 for specifying an arithmetic expression in the groups of the third stage 25 corresponds to identifier information 21 for identifying such information. Here, the arithmetic expression is specified by the third arithmetic expression specifying information 22.

Figure 4:
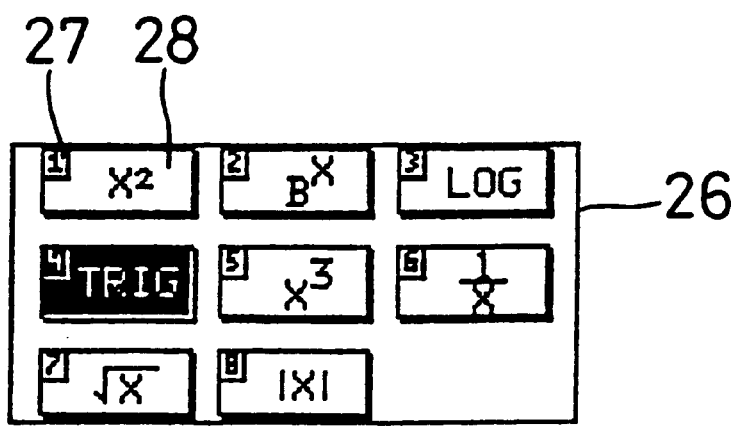
FIG. 4 shows a display screen 26 based on the contents classified into groups in a first stage 23 of the arithmetic expression menu table 16.

FIG. 4 shows a display screen 26 based on the contents classified into the groups in the first stage 23 of the arithmetic expression menu table 16. When the arithmetic expression menu display command key 14 is specified, the display screen 26 is displayed at first. The display screen 26 is divided into a plurality of areas each comprising an identifier area 27 based on the identifier information 17 in the table 16 and first arithmetic expression selecting area 28 based on the first arithmetic expression specifying information 18 in the table 16. Specifying a desired area by the input pen allows a group of arithmetic expressions in the specified area is selected. Here, the specified area may be either the identifier area 27 or the first arithmetic expression selecting area 28.

Figure 5:
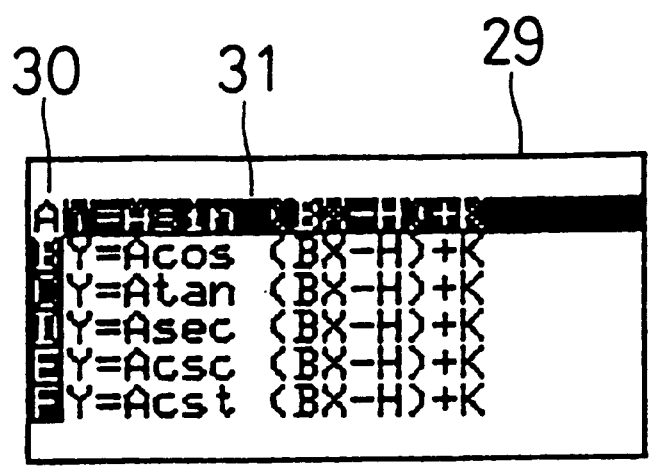
FIG. 5 shows a display screen 29 based on the contents classified into groups in a second stage 24 of the arithmetic expression menu table 16.

FIG. 5 shows a display screen 29 based on the contents classified into the groups in the second stage 24 of the arithmetic expression menu table 16. When the desired group of arithmetic expression in the first stage is selected on the display screen 26, then the display screen 29 showing the groups in the second stage of the selected arithmetic expression group is displayed. The display screen 29 is divided into a plurality of areas each comprising an identifier area 30 based on the identifier information 19 in the table 16 and second arithmetic expression selecting area 31 based on the second arithmetic expression specifying information 20 in the table 16. Specifying a desired area by the input pen allows a group of arithmetic expressions in the specified area to be selected. The specified area may be either the identifier area 30 or the second arithmetic expression selecting area 31 also in this case.

Figure 6A:
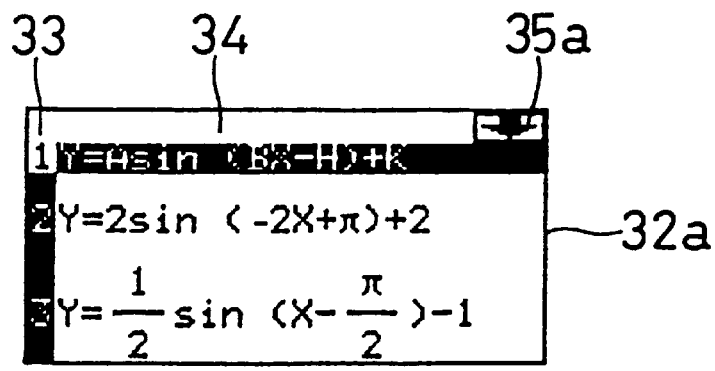
FIGS. 6A through 6C show display screens 32a through 32c based on the contents classified into groups in a third stage 25 of the arithmetic expression menu table 16.
Figure 6B:
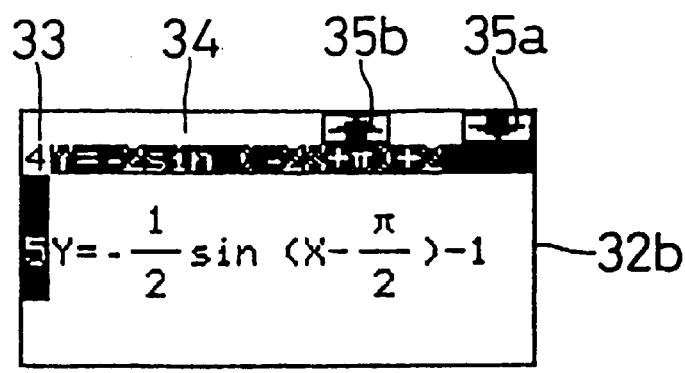
Figure 6C:
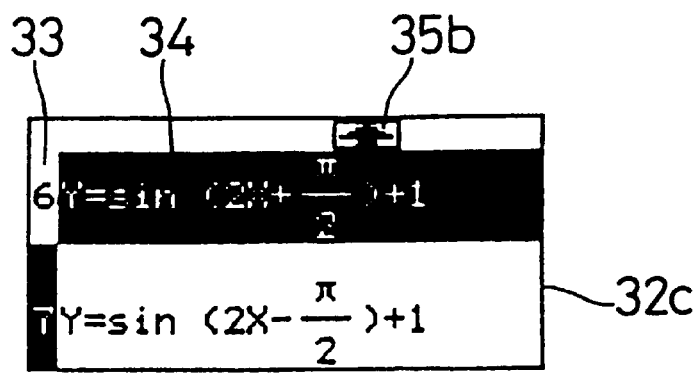

FIGS. 6A through 6C show, respectively, display screens 32a through 32c based on the contents classified into the groups in the third stage 25 of the arithmetic expression menu table 16. When the desired group of arithmetic expression in the second stage is selected on the display screen 29, then the display screens 32a through 32c showing the groups in the third stage of the selected arithmetic expression group are displayed. The display screens 32a through 32c are divided into a plurality of areas each comprising an identifier area 33 based on the identifier information 21 in the table 16 and third arithmetic expression selecting area 34 based on the third arithmetic expression specifying information 22 in the table 16. Specifying a desired area by the input pen allows a group of arithmetic expressions in the specified area to be selected. The specified area may be either the identifier area 33 or the third arithmetic expression selecting area 34 also in this case.

It is noted that a down scroll specifying button 35a or an up scroll specifying button 35b for scrolling the content displayed on the screen In the predetermined down or up direction as necessary are displayed on the display screens 32a through 32c. The screens 32a through 32c may be displayed while switching them each other by specifying the buttons 35a and 35b.

As described above, the electronic computing apparatus 1 and the arithmetic processing method applied to such computing apparatus of the present embodiment allow an arithmetic expression to be selected and input from the arithmetic expression menu table 16 for storing the predetermined plurality of arithmetic expressions. The controller 2 related to the arithmetic processing means executes the arithmetic processing in accordance with the arithmetic expression thus selected and input. The result of the arithmetic processing is displayed as a graph on the display 10 based on the command of the graph display command key 8 for example. Accordingly, the arithmetic expression may be readily inputted just by selecting the arithmetic expression from the predetermined plurality of arithmetic expressions. Because the arithmetic expression menu table 16 is displayed on the display 10, a desired arithmetic expression may be readily and reliably inputted while watching all the arithmetic expressions.

It is noted that although it has been arranged so as to select and input the arithmetic expression by specifying the predetermined area on the display screens 26, 29 and 32a through 32c in the embodiment described above, it is also possible to arrange so as to select and input the arithmetic expression by specifying keys which correspond to the identifier areas 27, 30 and 33.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic computing apparatus having an arithmetic processing function comprising:

arithmetic expression selecting means for selecting one arithmetic expression from among a predetermined plurality of arithmetic expressions;

arithmetic processing means for executing arithmetic processing in accordance with the arithmetic expression selected by the arithmetic expression selecting means;

the arithmetic expression selecting means including an arithmetic expression table for storing the predetermined plurality of arithmetic expressions into a plurality of groups, each group being separated into a plurality of stages, each of said stages successive to a first of said stages including one or more arithmetic expressions which is an expansion of an arithmetic expression included in said first or another previous stage, and means for displaying the arithmetic expression table for said selection of said one arithmetic expression.

2. The electronic computing apparatus having an arithmetic processing function of claim 1, wherein the arithmetic expression selecting means selects the arithmetic expression specified by the arithmetic expression specifying means from among the predetermined plurality of arithmetic expressions stored in the arithmetic expression table.

3. The electronic computing apparatus having an arithmetic processing function of claim 2, further comprising arithmetic expression table displaying means for displaying the arithmetic expression table.

4. The electronic computing apparatus having an arithmetic processing function of claim 1 further comprising means for graphing the result of the arithmetic processing in accordance with the selected arithmetic expression.

5. An arithmetic processing method of an electronic computing apparatus comprising the steps of:

selecting one arithmetic expression from among the predetermined plurality of arithmetic expressions; and executing arithmetic processing in accordance with the selected arithmetic expression by the arithmetic expression selecting means;

the arithmetic expression selecting being made from a displayed arithmetic expression table storing the predetermined plurality of arithmetic expressions using arithmetic expression identifying information;

the plurality of arithmetic expressions stored in the arithmetic expression table being separated into a plurality of groups, each group being further separated into a plurality of stages, each successive stage including one or more arithmetic expressions that expands upon an arithmetic expression included in the previous stage.

6. The arithmetic processing method of an electronic computing apparatus of claim 5, wherein all selectable arithmetic expressions are displayed in selecting an arithmetic expression.

7. An electronic computing apparatus having an arithmetic processing function comprising:

a table for storing a predetermined plurality of arithmetic expressions and a plurality of identifiers, each of said arithmetic expressions corresponding to one of said identifiers, said identifiers and, in turn, their corresponding arithmetic expressions, being classified into a plurality of groups, each of said groups being separated into a plurality of stages, each successive stage including one or more arithmetic expressions, each of said one or more arithmetic expressions being an expansion of an arithmetic expression included in a previous stage, a display for displaying the table of arithmetic expressions and identifiers, an input device for selecting arithmetic expressions from among the predetermined plurality of arithmetic expressions; and a processor for executing arithmetic processing in accordance with the arithmetic expressions selected by the input device.

8. The electronic computing apparatus having an arithmetic processing function of claim 7, wherein the display includes a plurality of displays of arithmetic expressions and identifiers, each said display being based on a selected portion of the table of arithmetic expressions and identifiers.

9. The electronic computing apparatus having an arithmetic processing function of claim 7, wherein the input device for selecting arithmetic expressions is an input pen connected to a display pointed position detecting circuit.

10. The electronic computing apparatus having an arithmetic processing function of claim 6, wherein the arithmetic expressions include functional expressions and equations.

11. The electronic computing apparatus having an arithmetic processing function of claim 7 wherein the processor graphs the result of the arithmetic processing in accordance with the selected arithmetic expression.

12. An electronic computing apparatus having an arithmetic processing function comprising:

a predetermined plurality of arithmetic expressions stored in a table, said arithmetic expressions being classified into a plurality of groups, each of said groups of arithmetic expressions being separated into a plurality of stages, successive ones of said stages including one or more arithmetic expressions which is an expansion of an expansion of an arithmetic expression included in a previous stage;

a plurality of successive groups of identifier information, each of said successive stages of arithmetic expressions corresponding to one of said plurality of successive groups of identifier information;

a display for displaying portions of the arithmetic expressions grouped in said table by corresponding ones of said groups of identifier information;

an input device for selecting at least one arithmetic expression from the predetermined plurality of arithmetic expressions; and a processor for executing arithmetic processing in accordance with the arithmetic expression selected by the input device.

13. The electronic computing apparatus having an arithmetic processing function of claim 12, wherein the display displays the entire table of arithmetic expressions grouped by corresponding ones of said groups of identifier information.

14. The electronic computing apparatus having an arithmetic processing function of claim 12, wherein each of said groups of arithmetic expressions are classified into first through third stages of arithmetic expressions, and each of said stages corresponding to one of first through third groups of identifier information.

* * * * *